United States Patent
Kang et al.

(10) Patent No.: US 6,483,917 B1
(45) Date of Patent: Nov. 19, 2002

(54) TELEPHONE WITH A RECEIVER AROUSING BONE-CONDUCTION AND AIR-CONDUCTION HEARING

(75) Inventors: Kyeong Ok Kang, Daejeon (KR); Jin Woo Hong, Daejeon (KR); Hee Soo Kim, Kyunggi-do (KR); Ki Bang Lee, Seoul (KR)

(73) Assignee: Electronics and Telecommunications Research Insitute, Daejeon (KR)

( * ) Notice: Subject to any disclaimer, the term of this patent is extended or adjusted under 35 U.S.C. 154(b) by 0 days.

(21) Appl. No.: 09/485,296

(22) PCT Filed: Nov. 4, 1997

(86) PCT No.: PCT/KR97/00214
§ 371 (c)(1),
(2), (4) Date: Feb. 8, 2000

(87) PCT Pub. No.: WO99/09785
PCT Pub. Date: Feb. 25, 1999

(30) Foreign Application Priority Data

Aug. 19, 1997 (KR) .............................................. 97-39411

(51) Int. Cl.⁷ ................................................ H04M 1/00
(52) U.S. Cl. .................................. 379/433.02; 379/430
(58) Field of Search ............................ 379/433.02, 430; 455/568; 381/151, 326, 328, 370, 380

(56) References Cited

U.S. PATENT DOCUMENTS 4,322,585 A * 3/1982 Liantand ..................... 455/568
5,991,637 A * 11/1999 Mack et al. ................. 381/151

FOREIGN PATENT DOCUMENTS

| JP | 59-209000 | 11/1984 |
| JP | 5-276587 | 10/1993 |
| JP | 7-66861 | 3/1995 |
| JP | 8-331220 | 12/1996 |

* cited by examiner

Primary Examiner—Jack Chiang
(74) Attorney, Agent, or Firm—Antonelli, Terry, Stout & Kraus, LLP

(57) ABSTRACT

A telephone system is provided with a receiver equipped to enable a hearing-impair person to receive a telephone call through bone-conduction and air-conduction hearing. Such a receiver comprises a frame supporting a main vibration source including a cylindrical bobbin and a voice coil wound around the bobbin to convert a voice signal into a variation of a magnetic field; a vibration generator including a yoke arranged inside a lower portion of the bobbin, an electromagnet arranged on the yoke to create a gap with the bobbin, and an upper plate arranged on the electromagnet to support the electromagnet; an auxiliary vibration source including an air-conduction vibrator arousing air-conduction hearing and a bone-conduction vibrator arousing a bone-conduction hearing; and a vibration transmitter arranged to transmit vibrations from the main vibration source and the bone-conduction vibrator of the auxiliary vibration source to a transmission portion where a bone-conduction hearing transmission is selected for bone-conduction hearing.

20 Claims, 3 Drawing Sheets

TELEPHONE WITH A RECEIVER AROUSING BONE-CONDUCTION AND AIR-CONDUCTION HEARING

TECHNICAL FIELD

The present invention generally relates to a telephone with a receiver arousing bone-conduction and air-conduction hearing which converts an input electric voice signal into vibration and acoustic signals by using the receiver. More particularly, it relates to a telephone with a receiver arousing bone-conduction and air-conduction hearing which induces a person to sense a sound through bone-conduction and air-conduction hearing during a telephone call, makes a hearing-impaired person with conductive hearing loss and an old person who has difficulty in air-conduction hearing use bone-conduction hearing, and makes an ordinary person having a normal sense of hearing use either bone-conduction hearing in a noise environment or air-conduction hearing in a normal environment.

BACKGROUND ART

A conventional receiver consisting of a general telephone loudspeaker is an air-conduction receiver. An air vibration sound being an output signal of this loudspeaker passes through the outer ear of a pinna and an external auditory meatus by an auditory mechanism, is converted into mechanical vibrations of the tympanic membrane and three small bones of the middle ear, is then amplified, and is transmitted to an auditory nerve through a cochlea of the inner ear comprising a sensorineural system, thereby making the telephone user perceive a sound of the other person.

Accordingly, a hearing-impaired person who has a lesion in the outer or middle ear and an old person who has a lowered hearing ability can hardly use a telephone call. The ordinary people having a normal hearing ability feel inconvenience in a telephone call under a noise environment.

Since the person who has difficulty in hearing can perceive a voice signal through a bone vibration, a bone-conduction telephone using a bone-conduction vibrator as a receiver has been developed. However, in this case, this telephone includes both an air-conduction hearing hand-set employing an air-conduction receiver for the ordinary people and a bone-conduction hearing hand-set employing a bone-conduction receiver for the hearing impaired, or includes only a bone-conduction hearing hand-set. As a result, the size of the conventional telephone becomes increased, the cost of production is expensive, and an additional telephone is needed when the ordinary person and the hearing impaired person live in the same place because they feel inconvenience in using one telephone.

DISCLOSURE OF THE INVENTION

Accordingly, the present invention is directed to a telephone with a receiver arousing bone-conduction and air-conduction hearing that substantially obviates one or more of the problems due to limitations and disadvantages of the conventional art.

It is an objective of the present invention to provide a telephone with a receiver arousing bone-conduction and air-conduction hearing, which uses a vibrator assuring an effective transmission of the air vibration, uses a vibrator of smoothly arousing bone-conduction and air-conduction hearing as a receiver, is capable of hearing a vibration signal through bone-conduction hearing as well as an acoustic signal through air-conduction hearing, makes a hearing-impaired person with conductive hearing loss and an old person who has difficulty in air-conduction hearing use bone-conduction hearing, and makes an ordinary person having a normal sense of hearing use either bone-conduction hearing in a noise environment or air-conduction hearing in a normal environment.

To achieve the above object, a telephone with a receiver arousing bone-conduction and air-conduction hearing in accordance with the present invention includes:

an overvoltage protecting circuit for protecting a telephone's circuit from external overvoltage via a subscriber's line;

a ring signal controller which is connected to the overvoltage protecting circuit, controls sound volume of a ring signal informing a person of a terminating call, and outputs the ring signal to a loudspeaker;

a voice signal/subscriber's line controller which is connected to the overvoltage protecting circuit, controls the subscriber's line by the terminating call and an originating call, and controls a transmitting/receiving of both an electric voice signal and a DTMF dial signal;

two-wire/four-wire converter which is connected to the voice signal/subscriber's line controller, and performs two-wire/four-wire conversion in order to separate the receiving or the transmitting of the electric voice signal;

an amplifying circuit which is connected to the two-wire/four-wire converter, and amplifies the electric voice signal from the two-wire/four-wire converter in order to be received in a receiver of a hand-set;

a hand-set which includes a receiver and a transmitter, the receiver which receives and converts the electric voice signal from the amplifying circuit into a vibration signal and an acoustic signal and enables the vibration signal and the acoustic signal to be heard by using bone-conduction and air-conduction hearing, respectively, and the transmitter which converts an input voice signal into an electric signal and transmits the electric signal to the two-wire/four-wire converter;

a dial button for receiving a telephone number of the other person as an input;

a control circuit which is connected to the dial button, detects each number of the input telephone number, and controls the voice signal/subscriber's line controller;

a DTMF signal generator which is connected to the control circuit, and generates a DTMF signal corresponding to each number applied from the dial button in response to a control of the control circuit; and a hook switch which is connected to the voice signal/subscriber's line controller, and initially controls the originating call and the terminating call.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF DRAWINGS

The present invention will become more fully understood from the detailed description given hereinbelow and the accompanying drawings which are given by way of illustration only, and thus are not limitative of the present invention, and wherein.

BEST MODE FOR CARRYING OUT THE INVENTION

The preferred embodiment of the present invention will become apparent from a study of the following detailed description, when viewed in light of the accompanying drawings.

Figure 1:
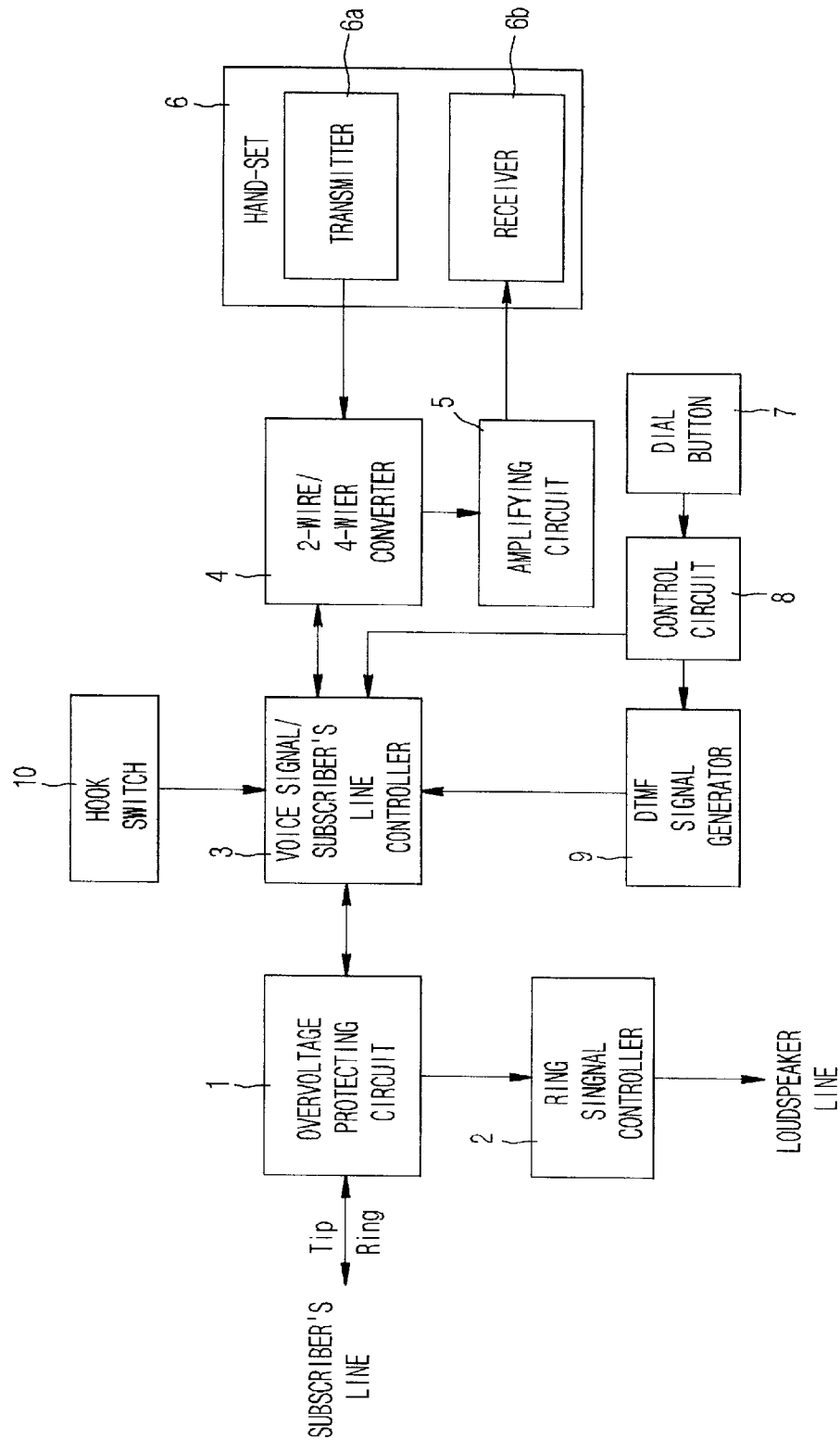
FIG. 1 is a block diagram illustrating a telephone with receiver arousing bone-conduction and air-conduction hearing in accordance with a preferred embodiment of the present invention.
Figure 2:
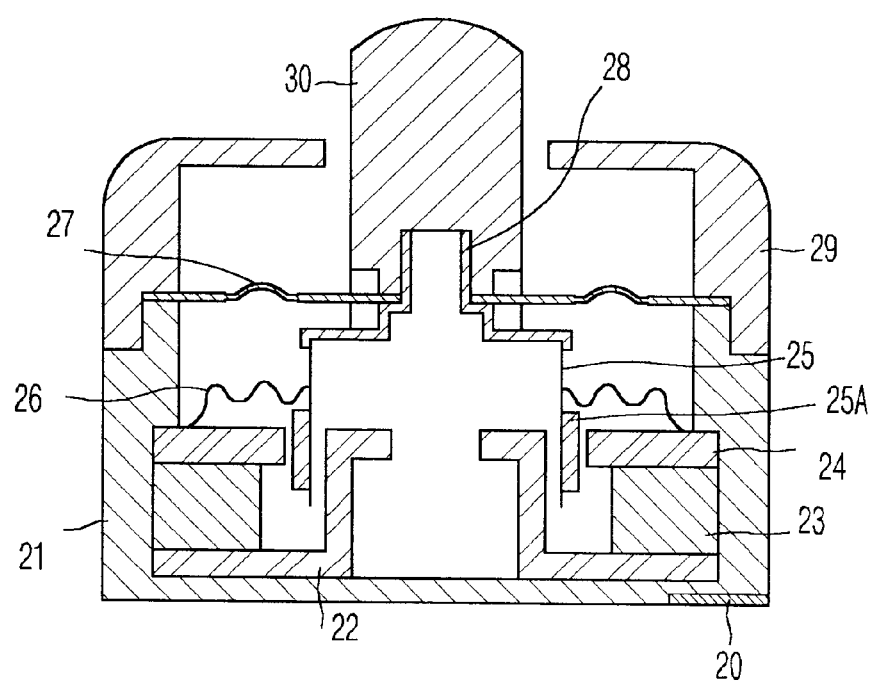
FIG. 2 is a cross-sectional view illustrating a receiver arousing bone-conduction and air-conduction hearing in accordance with a preferred embodiment of the present invention.
Figure 3A:
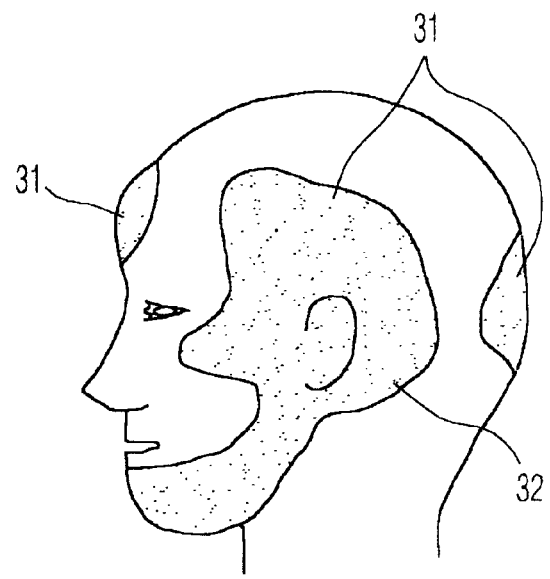
FIG. 3A is a side view of a head illustrating a good transmission portion of bone-conduction hearing.
Figure 3B:
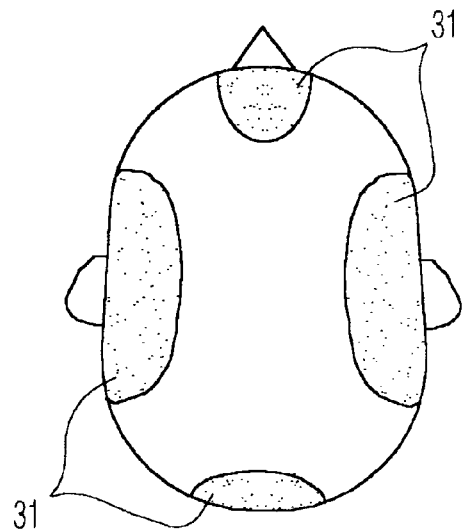
FIG. 3B is a plan view of a head illustrating a good transmission portion of a bone-conduction hearing.

FIG. 1 is a block diagram illustrating a telephone with receiver arousing bone-conduction and air-conduction hearing in accordance with a preferred embodiment of the present invention; FIG. 2 is a cross-sectional view illustrating a receiver arousing bone-conduction and air-conduction hearing in accordance with a preferred embodiment of the present invention; FIG. 3A is a side view of a head illustrating a good transmission portion of a bone-conduction hearing; and FIG. 3B is a plan view of a head illustrating a good transmission portion of a bone-conduction hearing.

As shown in FIGS. 1 to 3B, the present invention relates to a telephone with a receiver arousing bone-conduction and air-conduction hearing so as to make a person possible to hear voice and acoustic signals through bone-conduction hearing and air-conduction hearing.

As shown in FIG. 2, the receiver 6a includes:

main vibration sources 25 and 25a which vibrate by converting an input electric voice signal into a variation of a magnetic field;

vibration generators 22, 23 and 24 which serve as a permanent magnet, make magnetic circuits, generate a secondary magnetic field, create attraction and repulsion operations between the secondary magnetic field and the magnetic field of the main vibration sources 25 and 25a, and make the main vibration sources 25 and 25a vertically vibrate in a gap formed between the magnetic circuits;

auxiliary vibrators 26, 27 and 28 which reinforce a vibration of the main vibration sources 25 and 25a, include an air-conduction vibrator 26 arousing air-conduction hearing, and include bone-conduction vibrators 27 and 28 arousing bone-conduction hearing;

a vibration transmitter 30 which directly transmits an entire vibration by both the vibration of the main vibration sources 25 and 25a and the vibration of the bone-conduction vibrators 27 and 28 of the auxiliary vibrators 26, 27 and 28 to a portion 31 where a bone-conduction hearing transmission is very good, and thus arouses bone-conduction hearing; and vibration stabilizers 21 and 29 for stably maintaining the vibrations of the main vibration sources 25 and 25a and the auxiliary vibrators 26, 27 and 28.

A cylindrical bobbin 25 whose inner parts are vertically penetrated includes a voice coil 25a for a vibrator. The voice coil is wound on the bobbin 25, converts a voice signal into a magnetic field's variation, and the impedance of the voice coil corresponds to a predetermined impedance of the vibrator. Here, the bobbin 25 and the voice coil 25a serve as the main vibration sources.

A yoke 22 is partially inserted into the receiver shown in FIG. 2 through an inner side of a lower part of the bobbin 25. An electromagnet 23 and an upper plate 24 are sequentially positioned on the yoke 22 along with an exterior part of the yoke 22, and make a gap between them and the bobbin 25 at the exterior side of the bobbin 25. The upper plate 24 supports the electromagnet 23. The yoke 22, the electromagnet 23 and the upper plate 24 serve as a permanent magnet, and are operated as vibration generators consisting of the magnetic circuit.

The gap of the magnetic circuit has a shape having a small leakage magnetic flux so as to maintain a smooth vibration of the voice coil 25a, and is narrowly designed to enhance the efficiency of the magnetic circuit.

A frame 21 is positioned at the outside of the magnetic circuit including the yoke 22, the electromagnet 23 and the upper plate 24. A damper 26 is attached to a circumference of the bobbin 25, and is mounted on the upper plate 24. A hat-shaped coil cap 28 whose upper and lower parts are opened, is positioned on an upper circumference of the bobbin 25. A vibration plate 27 of a plate spring is connected to the external side of the coil cap 28, and is mounted on four portions of an upper circumference of the frame 21.

Herein, the damper 26 reinforces an air vibration according to a vibration of the bobbin 25, and thus serves as the air-conduction vibrator arousing air-conduction hearing. The coil cap 28 and the vibration plate 27 reinforce a vibration according to a vibration of the bobbin 25, and thus serve as bone-conduction vibrators arousing bone-conduction hearing. The damper 26, the coil cap 28 and the vibration plate 27 make auxiliary vibrators. In addition, the vibration plate 27 has a cross shape to achieve a smooth transmission of the air vibrations of the bobbin 25 and the damper 26, and a curvature for reinforcing a vertical vibration is formed on a predetermined position in the cross.

A vibration contact portion 30 being the vibration transmitter is coupled with an external part of the coil cap 28. The vibration contact portion 30 directly transmits an entire vibration by the main vibration sources 25 and 25a and the auxiliary vibrators 26, 27 and 28 to a portion 31 where a bone-conduction hearing transmission is very good, thereby arousing bone-conduction hearing. Also, the vibration contact portion 30 determines a height and curvature in consideration of a contact portion between a human face and itself 30, and is then installed to the receiver of FIG. 2. In order to maintain a smooth vibration of the vibration plate 27 at a coupling portion between the vibration plate 27 and the coil cap 28, the vibration contact portion 30 maintains empty spaces having a predetermined size along with four branches of the cross of the vibration plate 27 when the vibration contact portion 30 is connected to the coil cap 28.

A predetermined top cover 29 is mounted on a step-like portion of the frame 21. Four portions of the vibration plate 27 are supported by the frame 21 and the top cover 29, and are fixed. In this case, in order to achieve a smooth transmission of the air vibrations of the bobbin 25 and the damper 26, a gap having a predetermined size is formed between the top cover 29 and the vibration contact portion 30. Also, the frame 21 and the top cover 29 stabilizes a vibration of the bobbin 25 functioned as a main vibration source, stabilizes vibrations of auxiliary vibrators (i.e., the damper 26, the vibration plate 27 and the coil cap 28), and thus stably maintains an entire vibration of both the main vibration sources and the auxiliary vibrators. Accordingly, the frame 21 and the top cover 29 are operated as vibration stabilizers.

In the meantime, a printed circuit board (PCB) terminal 20 is connected to the receiver through one side of the frame 21.

The aforementioned receiver arousing the bone-conduction and air-conduction hearing in accordance with the present invention will be operated as follows.

When the external voice signal is transmitted to the voice coil 25a through an electrode (not shown), a magnetic field is generated by a current flowing in the voice coil 25a, and an attraction/repulsion operation is generated between the magnetic field by the current flowing in the voice coil 25a and a magnetic field by the vibration generators. Accordingly, main vibration sources perform a vertical vibration in the gap of the magnetic circuit of vibration generators. The coil cap 28 which is connected to the upper circumference of the bobbin 25 and the vibration plate 27 of a plate spring which is connected to the external side of the coil cap 28 and has a curvature at a predetermined position in the cross, sequentially move upward and downward. As a result, the vibrations of the coil cap 28 and the vibration plate 27 further reinforce the bobbin 25's vibration, and thus arouse bone-conduction hearing through the vibration contact portion 30 being vibration transmitter.

Also, the bobbin 25's vibration generates an air vibration of the damper 26, and further reinforces the vibration. The air vibrations of the bobbin 25 and the damper 26 become to arouse air-conduction hearing At this time, the cross-shaped vibration plate 27 and the top cover 29 which maintains a gap between the vibration contact portion 30 and itself make a smooth transmission of the air vibrations of the bobbin 25 and the damper 26. The frame 21 and the top cover 29 maintain a stable entire vibration including the vibrations of both main vibration sources and auxiliary vibrators.

Accordingly, the vibrations of the bobbin 25, the coil cap 28 and the vibration plate 27 arouse bone-conduction hearing through the vibration contact portion 30, and the air vibrations of the bobbin 25 and the damper 26 arouse air-conduction hearing.

The aforementioned receiver arousing the bone-conduction and the air-conduction hearing is used in a telephone according to the present invention. If the telephone according to the present invention is used in a normal environment, the originating/terminating operation of a signal is identical with that of a general telephone.

The operations of the telephone using bone-conduction hearing will now be described with reference to FIG. 1.

As to a terminating call, when a subscriber using the telephone with the receiver arousing the bone-conduction and air-conduction hearing and the other subscriber are connected to each other, the electric voice signal via a subscriber's line passes through the overvoltage protecting circuit 1, the voice signal/subscriber's line controller 3 for controlling the subscriber's line by a terminating call and the electric voice signal, and the two-wire/four-wire converter 4 performing a two-wire to four-wire conversion to make a signal receiving possible. Then, the electric voice signal is transmitted to the amplifying circuit 5.

When the amplified electric voice signal from the amplifying circuit 5 is transmitted to the hand-set 6, the receiver 6a converts the electric voice signal into vibration and acoustic signals. As a result, the hearing-impaired person with conductive hearing loss and an old person who has difficulty in air-conduction hearing can use bone-conduction hearing via a good transmission portion 31 of a bone-conduction hearing, as shown in FIGS. 3A and 3B. More specifically, the hearing-impaired person and the old person use bone conduction hearing via a mastoid 32 to which a transmission of a bone-conduction hearing is best. Also, an ordinary person having a normal sense of hearing can use either bone-conduction hearing via the mastoid 32 in a noise environment or air-conduction hearing used for a general telephone in a normal environment.

In the meantime, as to an originating call, an electric voice signal from the transmitter 6b of the hand-set 6 passes through the two-wire/four-wire converter 4 performing a four-wire to two-wire conversion to make a signal transmitting possible, and the voice signal/subscriber's line controller 3 for controlling the subscriber's line by the originating call and the electric voice signal. Then, the electric voice signal is transmitted to the overvoltage protecting circuit 1, and an output signal of the overvoltage protecting circuit 1 is transmitted to the other person via a telephone line.

Furthermore, the receiver arousing bone-conduction and air-conduction hearing in accordance with the present invention can be applicable to a cordless telephone or a radio communication system.

The present invention makes a hearing-impaired person with conductive hearing loss and an old person who has difficulty in air-conduction hearing use bone-conduction hearing during a telephone call, and makes an ordinary person having a normal sense of hearing use bone-conduction hearing in a noise environment, thereby facilitating a telephone call. The present invention does not need a plurality of receivers for air-conduction hearing and bone-conduction hearing, and includes functions of both air-conductive hearing and bone-conduction hearing into only one receiver. Specifically, since the present invention adopts a vibrator structure to maintain a smooth transmission of the air vibration, it has an economical advantage and a practicality. Accordingly, the ordinary person having a normal sense of hearing can use the telephone according to the present invention in a normal environment by using air-conduction hearing. Further, the present invention can be applicable to an apparatus for enhancing a hearing ability of a hearing impaired person, to a telephone for military use, and also to a music receiving apparatus for bone-conduction hearing.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A telephone with a receiver arousing bone-conduction and air-conduction hearing, comprising:

an overvoltage protector which protects the telephone from an overvoltage via a subscriber's line;

a ring signal controller connected to said overvoltage protector, which controls a volume of a ring signal and outputs said ring signal to a loudspeaker;

a voice signal/subscriber's line controller connected to said overvoltage protector, which controls said subscriber's line and controls transmission/reception of both an electric voice signal and a dial signal;

a two-wire/four-wire converter connected to said voice signal/subscriber's line controller, which performs two-wire/four-wire conversion to separate the transmission/reception of the electric voice signal;

an amplifier circuit connected to said two-wire/four-wire converter, which amplifies said electric voice signal from said two-wire/four-wire converter; and a hand-set including a receiver which receives and converts said electric voice signal into a vibration signal and an acoustic signal to be heard via bone-conduction and air-conduction hearing, respectively, and a transmitter which converts an input voice signal into an electric signal and transmits said electric signal to said two-wire/four-wire converter;

wherein said receiver includes:
a main vibration source which vibrates by converting a voice signal applied from an external voice signal source into a variation of a magnetic field;
a vibration generator which generates a secondary magnetic field, creates attraction and repulsion operations between said secondary magnetic field and said magnetic field of said main vibration source, and makes said main vibration source vibrate in a vertical direction;
an auxiliary vibrator which reinforces a vibration of said main vibration source, includes an air-conduction vibrator arousing air-conduction hearing, and a bone-conduction vibrator arousing a bone-conduction hearing;
a vibration transmitter which directly transmits an entire vibration by both a vibration of said main vibration source and a vibration of said bone-conduction vibrator of said auxiliary vibrator to a transmission portion where a bone-conduction hearing transmission is good for bone-conduction hearing; and
a vibration stabilizer which stabilizes vibrations of said main vibration source and said auxiliary vibrator.

2. The telephone as claimed in claim 1, wherein said main vibration source of said receiver includes:
a cylindrical bobbin of which inner parts are vertically penetrated; and
a voice coil wound on a circumference of said bobbin, which converts a voice signal into a magnetic field's variation.

3. The telephone as claimed in claim 2, wherein said vibration generator of said receiver includes:
a yoke partially inserted said receiver through an inner side of a lower part of said bobbin;
an electromagnet positioned to make a gap between said electromagnet and said bobbin at an exterior side of said bobbin; and
an upper plate positioned on said electromagnet, which supports said electromagnet.

4. The telephone as claimed in claim 1, wherein said vibration generator of said receiver serves as a permanent magnet, makes a magnetic circuit, and forms a gap to make said main vibration source vibrated within said gap.

5. The telephone as claimed in claim 3 wherein said air-conduction vibrator of said auxiliary vibrator is a damper mounted to a circumference of said bobbin and mounted on said upper plate.

6. The telephone as claimed in claim 2, wherein said vibration stabilizer of said receiver includes:
a frame positioned at outside of said magnetic circuit make by said vibration generator of said receiver; and
a top cover mounted on a step-like portion of said frame.

7. The telephone as claimed in claim 6 wherein said top cover of said receiver maintains a gap between said top cover and said vibration transmitter in order to achieve a smooth transmission of air vibrations of said bobbin and said damper.

8. The telephone as claimed in claim 2, wherein said bone-conduction vibrator of said auxiliary vibrator of said receiver includes:

a hat-shaped coil cap connected to an upper circumference of said bobbin, of which upper and lower parts are opened; and
a vibration plate of a plate spring, connected to an external side of said coil cap and an upper-circumference of a step-like portion of said frame.

9. The telephone as claimed in claim 8 wherein said vibration plate of said receiver has a cross shape in order to achieve a smooth transmission of air vibrations of said main vibration source and said damper.

10. The telephone as claimed in claim 9 wherein said vibration plate of said receiver has a curvature formed on a predetermined position within said cross shape in order to reinforce a vertical vibration.

11. The telephone as claimed in claim 1 wherein said vibration transmitter of said receiver is a vibration contact portion which maintains empty spaces having a predetermined size along with tour branches of a cross of said vibration plate, in order to maintain a smooth vibration of said vibration plate at a coupling portion between said vibration plate and said coil cap when said vibration contact portion is connected to said coil cap.

12. The telephone as claimed in claim 6 wherein said frame and said top cover of said receiver support four portions of a cross shape in said vibration plate.

13. The telephone as claimed in claim 8 wherein said frame and said top cover of said receiver support four portions of a cross shape in said vibration plate.

14. A receiver of a telephone system for enabling a hearing-impair person to receive a telephone call through bone-conduction and air-conduction hearing, said receiver comprising:
a main vibration source which vibrates by converting a voice signal applied from a voice signal source into a vibration of a magnetic field;
a vibration generator which generates a secondary magnetic field, creates attraction and repulsion operations between said secondary magnetic field and said magnetic field of said main vibration source, and enables said main vibration source to vibrate in a vertical direction;
an auxiliary vibrator which reinforces a vibration of said main vibration source, and which includes an air-conduction vibrator arousing air-conduction hearing and a bone-conduction vibrator arousing a bone-conduction hearing;
a vibration transmitter which directly transmits an entire vibration by both a vibration of said main vibration source and a vibration of said bone-conduction vibrator of said auxiliary vibrator to a transmission portion where a bone-conduction hearing transmission is selected for bone-conduction hearing, and
a vibration stabilizer which stabilizes vibrations of said main vibration source and said auxiliary vibrator.

15. The receiver as claimed in claim 14, wherein the main vibration source comprises:
a cylindrical bobbin; and
a voice coil wound on the cylindrical bobbin to convert the voice signal into the variation of a magnetic field.

16. The receiver as claimed in claim 15, wherein the vibration generator comprises:
a yoke inserted through an inner side of the bobbin;
an electromagnet positioned on the yoke, to create a gap between the electromagnet and the bobbin; and
a plate positioned on the electromagnet, to support the electromagnet.

17. The receiver as claimed in claim 16 wherein the vibration generator serves as a permanent magnet and forms a gap to enable the main vibration source to vibrate within the gap.

18. The receiver as claimed in claim 17 wherein the air-conductor vibrator is a damper attached to a circumference of the bobbin and mounted on the plate, to reinforce the air vibration; and the vibration stabilizer comprises a frame and a top cover arranged to stabilize vibrations of both the main vibration source and the auxiliary vibrator.

19. A receiver of a telephone system for enabling a hearing-impair person to receive a telephone call through bone-conduction and air-conduction hearing, said receiver comprising:
- a frame supporting a main vibration source including a cylindrical bobbin and a voice coil wound around the bobbin to convert a voice signal into a variation of a magnetic field;
- a vibration generator including a yoke arranged inside a lower portion of the bobbin, an electromagnet arranged on the yoke to create a gap with the bobbin, and an upper plate arranged on the electromagnet to support the electromagnet;
- an auxiliary vibration source including an air-conduction vibrator arousing air-conduction hearing and a bone-conduction vibrator arousing a bone-conduction hearing; and
- a vibration transmitter arranged to transmit vibrations from the main vibration source and the bone-conduction vibrator of said auxiliary vibration source to a transmission portion where a bone-conduction hearing transmission is selected for bone-conduction hearing.

20. The receiver as claimed in claim 19, wherein the bone-conduction vibrator comprises:
- a coil cap connected to an upper circumference of the bobbin, and having upper and lower parts opened for transmitting vibrations to the vibration transmitter; and
- a vibration plate connected to an external side of the coil cap, and having a cross shape and a curvature formed on a predetermined position within the cross shape to reinforce the vibration in a vertical direction.

* * * * *